May 26, 1959 J. McCREATH WILSON 2,888,328
METHODS OF PRODUCING SILICON OF HIGH PURITY
Filed Aug. 14, 1956
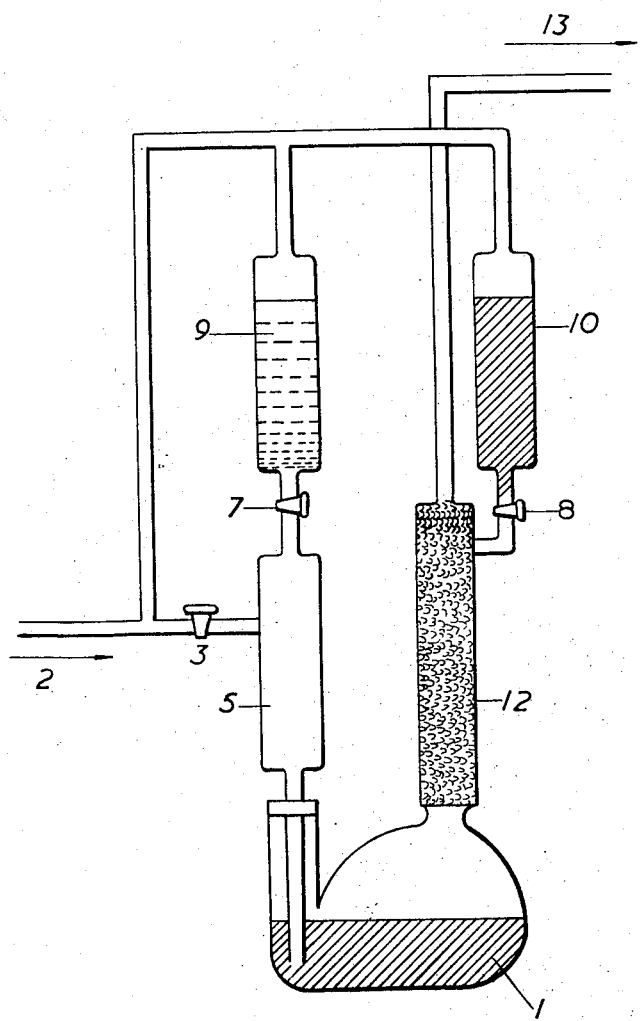
Inventor
J. M. WILSON
By
Attorney

United States Patent Office 2,888,328
Patented May 26, 1959

2,888,328

METHODS OF PRODUCING SILICON OF HIGH PURITY

Jack McCreath Wilson, London, England, assignor to International Standard Electric Corporation, New York, N.Y., a corporation of Delaware Application August 14, 1956, Serial No. 604,001

Claims priority, application Great Britain August 16, 1955

2 Claims. (Cl. 23—204)

The invention relates to a process for the manufacture of pure silicon, and particularly to a process to exclude the impurity boron from the silicon, and is an improvement in or modification of British Patent No. 745,698, published February 29, 1956.

Boron is electrically one of the most important impurities in silicon and it cannot be removed from solid silicon by such known purification processes as zone refining and repeated crystal pulling. In British Patent No. 745,698 a method of production of very pure silicon has been described which depends upon the decomposition by heat of silane ($SiH_4$), the silane being generated by the chemical reaction of silicon tetrachloride and lithium aluminium hydride. Should the silicon tetrachloride (or the lithium aluminium hydride or the solvent for either of these) contain any boron compounds as impurities, which is often the case, diborane could be produced. Diborane, however, is a volatile hydride of boron and decomposes thermally to form boron and hydrogen. Thus when silane containing diborane is thermally decomposed so is the diborane and boron appears as an impurity in the silicon. In the process described in the parent specification, predecomposition purification of the silane was carried out at a temperature below its cracking temperature, but it has been found that this is not adequate to remove boron completely.

It is accordingly the object of the present invention completely to eliminate the presence of diborane in the silane.

In order to clearly understand the principle of the invention it is necessary firstly to consider the method of preparation of diborane consisting of reacting boron trichloride with lithium aluminium hydride.

It has been shown by several workers that the order of addition of the reagents determines the course of the reaction. Thus when an ethereal slurry of lithium aluminium hydride is added to a solution of boron trichloride in ether a steady evolution of diborane occurs according to the equation

When the reagents are added in the reverse order and boron trichloride is added to lithium aluminium hydride, a negligible amount of diborane is generated until 50% of the stoichiometric amount of boron trichloride has been added. The explanation is that in this case there is a stepwise reaction, lithium borohydride being formed as an intermediate product. No diborane is formed until the whole of the lithium aluminium hydride has been converted to borohydride.

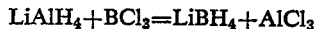

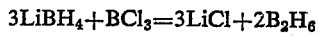

In accordance with the present invention, in the manufacture of silicon by the reaction of a solution of silicon tetrachloride with a liquid suspension of lithium aluminium hydride to produce silane and the subsequent thermal decomposition of the silane, the said reaction is carried out by adding a solution of silicon tetrachloride to the lithium aluminium hydride and maintaining an excess of lithium aluminium hydride, whereby the amount of diborane produced from impurities in the reagents is kept to a minimum.

An embodiment of the invention will now be described with reference to the accompanying drawing which shows diagrammatically an apparatus for carrying out the invention.

A suspension of lithium aluminium hydride in tetrahydrofuran is prepared in vessel 1 and tap funnel 10, and of silicon tetrachloride in tetrahydrofuran in the upper part of tap funnel 9.

A stream of inert gas such as argon, nitrogen, or hydrogen is passed into vessel 1 from an inlet pipe 2 through tap 3, and through the lower part of the funnel 5. This sweeps all the air out of vessel 1. After an interval a quantity of lithium aluminium hydride solution contained in tap funnel 10 is added to that already contained in vessel 1 by the opening of tap 8 which allows the hydride to flow through a tube 12 packed with material to give large surface exposure. Tap 8 is then closed and tap 7 opened to allow an equivalent stoichiometric amount of silicon tetrachloride to flow into vessel 1 from the upper half of tap funnel 9. The process of alternately opening taps 7 and 8 to allow equivalent stoichiometric amounts of lithium aluminium hydride and silicon tetrachloride to pass into vessel 1 is continued. The silane reaction thus takes place in an excess of lithium aluminium hydride and the substantially pure silane thus generated.

Any silicon tetrachloride, which may caintain boron trichloride, which may also become entrained in the gas stream, is removed by passing the gas stream through the packed tube 12 down which the solution of lithium aluminium hydride flows. This process also removes any diborane which may have been formed, in parts of the apparatus between the generator flask and the packed column, by reaction between any lithium aluminium hydride and silicon tetrachloride, containing boron compounds as impurities, which have become entrained in the gas stream. This process could also be used if for any reason the first stage of the process was not carried out. After passing through condensers, etc. which prevent any of the reactants passing along with the gas, the gas stream, now consisting only of the inert gas and silane, is then passed via pipe 13 to the apparatus wherein the silane is decomposed.

It is to be understood that the apparatus is provided with all the necessary trap joints between the different portions thereof. All the enclosing walls and pipes shown should be made of high purity silica. The silica of which vessel 1 in particular is made, and preferably also other vessels and tubes, should be free from any boron or other material which may form a significan impurity in the silicon.

By preparing the silane as described above the resulting silicon had a boron content below the detection limit of the analytical method (i.e. below 0.2 p.p.m).

It is to be understood that there may be interposed between the tube 13 and the vessel in which the silane is thermally decomposed, a vessel heated to a temperature lower than the decomposition temperature of silane but high enough to decompose compeletely other hydrides which may exist as impurities in the silane, and perhaps any small traces of borane which may remain.

It may be noted that the use of tetrahydrofuran for forming solutions or suspensions of the reactants is preferable to the use of ether because of the higher flash point of the former. This has been found to reduce the chances of explosion in the plant used. This plant has been considered to be extremely dangerous when ether has been used.

While the principles of the invention have been described above in connection with specific embodiments, and particular modifications thereof, it is to be clearly understood that this description is by way of example and not as a limitation on the scope of the invention.

What I claim is:

1. A process of manufacture of substantially pure silane by the reaction of silicon tetrachloride, which may have boron present as an impurity, with lithium aluminium hydride to produce silane for the manufacture of silicon by the subsequent thermal decomposition of the silane, comprising carrying out said reaction by adding the silicon tetrachloride to an excess quantity of lithium aluminium hydride and at maintaining an excess of lithium aluminium hydride in the mixture over that required for complete chemical reaction whereby the production of diborane as an impurity in the silane from any boron compounds present in the reagents is kept to a minimum.

2. A process as claimed in claim 1, in which the silicon tetrachloride is present as a solution of silicon tetrachloride in tetrahydrofuran and in which the lithium aluminium hydride is suspended in tetrahydrofuran.

References Cited in the file of this patent

FOREIGN PATENTS 745,698     Great Britain  ----------  Feb. 29, 1956

OTHER REFERENCES

Finhatt et al.: "Journal of American Chemical Society," May 1947, vol. 69, pages 1199–1203.

Pearson et al.: "Chem Abs.," vol. 43, page 4068, 1949.

Mellor: "A Comprehensive Treatise on Inorganic and Theoretical Chemistry," Longmans, Green and Co., 1925, vol. 6, pages 961 and 219.